(12) United States Patent
Hattori

(10) Patent No.: US 9,487,411 B2
(45) Date of Patent: Nov. 8, 2016

(54) METHOD OF MANUFACTURING MAGNETIC PARTICLES

(71) Applicant: FUJIFILM CORPORATION, Minato-ku, Tokyo (JP)

(72) Inventor: Yasushi Hattori, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 114 days.

(21) Appl. No.: 14/258,739

(22) Filed: Apr. 22, 2014

(65) Prior Publication Data

US 2014/0314658 A1    Oct. 23, 2014

(30) Foreign Application Priority Data

Apr. 23, 2013  (JP) ................ 2013-090244

(51) Int. Cl.
| | | |
|---|---|---|
| *H01F 1/11* | (2006.01) | |
| *G11B 5/712* | (2006.01) | |
| *C01G 49/00* | (2006.01) | |
| *C01G 49/06* | (2006.01) | |
| *C01G 49/02* | (2006.01) | |

(52) U.S. Cl.
CPC ........... *C01G 49/06* (2013.01); *C01G 49/0036* (2013.01); *C01G 49/02* (2013.01); *G11B 5/712* (2013.01); *H01F 1/112* (2013.01); *C01P 2004/64* (2013.01); *C01P 2004/84* (2013.01); *C01P 2006/42* (2013.01)

(58) Field of Classification Search
CPC ........ H01F 1/11; H01F 1/112; H01F 1/0054; H01F 1/01; H01F 1/15333; H01F 1/348; H01F 1/36; H01F 41/005; H01F 1/0315; H01F 1/061; C01G 49/0036; C01G 49/0018; C01G 49/02; C01G 49/06; C01P 2004/64; C01P 2004/82; C01P 2006/42; C01P 2004/84; B82Y 25/00; G11B 5/712; G11B 5/70678; Y10S 428/90; C04B 2235/767; C04B 2235/3274; C04B 35/2683
USPC ..... 252/62.51 R, 62.63, 62.55, 62.56, 62.58; 428/402, 403; 423/594.2, 633; 264/611; 427/127

See application file for complete search history.

(56) References Cited

U.S. PATENT DOCUMENTS

| | | | | |
|---|---|---|---|---|
| 3,535,245 A | * | 10/1970 | Lindquist ................ | C04B 35/26 252/62.57 |
| 4,321,303 A | * | 3/1982 | Morita ............... | G11B 5/70657 252/62.55 |
| 4,810,402 A | * | 3/1989 | Mair ........................ | C01G 1/00 252/62.58 |
| 8,524,108 B2 | | 9/2013 | Hattori | |
| 2009/0011285 A1 | * | 1/2009 | Nakamura ................ | G11B 5/70 428/847.2 |
| 2010/0238063 A1 | * | 9/2010 | Ohkoshi ................. | B82Y 30/00 252/62.58 |
| 2011/0027588 A1 | | 2/2011 | Hattori et al. | |
| 2011/0151281 A1 | * | 6/2011 | Inoue ....................... | G11B 5/70 428/846 |
| 2011/0175014 A1 | | 7/2011 | Hattori | |
| 2011/0244272 A1 | * | 10/2011 | Suzuki ................... | B82Y 30/00 428/842.8 |
| 2012/0018665 A1 | * | 1/2012 | Hattori .................... | H01F 1/061 252/62.55 |

FOREIGN PATENT DOCUMENTS

| | | | | |
|---|---|---|---|---|
| JP | 62-275027 A | | 11/1987 | |
| JP | 2008-100871 A | | 5/2008 | |
| JP | 2008308711 A | * | 12/2008 | ............. C01G 49/00 |
| JP | 2011-216838 A | | 10/2011 | |
| JP | 2012-027978 A | | 2/2012 | |
| JP | 2012-160486 A | | 8/2012 | |
| WO | WO 2007114455 A1 | * | 10/2007 | ......... C01G 49/0018 |
| WO | 2011/125633 A1 | | 6/2015 | |

OTHER PUBLICATIONS

Machine translation of JP 2008308711A, printed Sep. 24, 2015.*
Zhao et al., "Fabrication of Uniform Magnetic Nanocomposite Spheres with a Magnetic Core/Mesoporous Silica Shell Structure", Jun. 7, 2005, J. Am. Chem. Soc, 127, pp. 8916-8917.*
Dar et al., "Single crystallite magnetite, maghemite, and hematite nanoparticles with rich coercivity", 2013, The Royal Society of Chemistry, Electronic Supplementary Material (ESI) for RSC Advances, 4 pages.*
Office Action dated Jun. 23, 2015 from the Japanese Patent Office in counterpart Japanese Application No. 2013-090244.

\* cited by examiner

*Primary Examiner* — Matthew E Hoban
*Assistant Examiner* — Lynne Edmondson
(74) *Attorney, Agent, or Firm* — Sughrue Mion, PLLC

(57) ABSTRACT

The method of manufacturing magnetic particles, wherein the magnetic particles are magnetic particles for magnetic recording, and includes subjecting starting material magnetic particles to glass component-adhering treatment to be adhered with a glass component, and subjecting the magnetic particles after the glass component-adhering treatment to coercive force-reducing treatment with heating, to provide magnetic particles having lower coercive force than the starting material magnetic particles.

16 Claims, No Drawings

METHOD OF MANUFACTURING MAGNETIC PARTICLES

CROSS-REFERENCE TO RELATED APPLICATIONS

This application claims the benefit of priority under 35 USC 119 to Japanese Patent Application No. 2013-090244 filed on Apr. 23, 2013, which is expressly incorporated herein by reference in its entirety.

BACKGROUND OF THE INVENTION

1. Field of the Invention

The present invention relates to a method of manufacturing magnetic particles for magnetic recording. More particularly, the present invention relates to a method of manufacturing magnetic particles for magnetic recording that can provide magnetic particles having coercive force and particle size that are suited to recording by achieving both a reduction in magnetic particle size and a reduction in coercive force.

The present invention further relates to magnetic particles for magnetic recording provided by the above manufacturing method.

2. Discussion of the Background

Conventionally, enhancing thermal stability to increase the crystal magnetic anisotropy of magnetic particles has been studied to prevent thermal fluctuation demagnetization in the field of magnetic recording. However, since the switching magnetic field of magnetic particles of high crystal magnetic anisotropy is high, coercive force would be high. A large external magnetic field becomes necessary for recording, recording properties of the magnetic particles of high crystal magnetic anisotropy would be poor.

Accordingly, various techniques have been proposed in recent years to keep the coercive force of magnetic particles to a suitable level for recording, or more specifically, to lower the coercive force of magnetic particles having high coercive force (for example, see Japanese Unexamined Patent Publication (KOKAI) No. 2012-027978 or English language family member US2012/018665A1, Japanese Unexamined Patent Publication (KOKAI) No. 2011-216838 or English language family member US2011/027588A1, and Japanese Unexamined Patent Publication (KOKAI) No. 2012-160486 or English language family member US2011/175014A1 and U.S. Pat. No. 8,524,108, which are expressly incorporated herein by reference in their entirety.

SUMMARY OF THE INVENTION

Each of the techniques described in above publication is capable of controlling the coercive force of the magnetic particles to within a range suited to recording. However, as a result of investigation, the present inventor has determined that further improvement is needed from the perspective of further reducing the particle size of the magnetic particles.

An aspect of the present invention provides for a means of achieving both a reduction in the size of the magnetic particles and an adjustment of coercive force.

The present inventor conducted extensive research. As a result, he presumed that the fact that the processing to reduce coercive force that is described in the above publications is accompanied by heating is what would hinder further size reduction in the magnetic particles. This point will be described in further detail. The fact that the magnetic particles would sinter and aggregate in the above heating is thought to be what would hinder further size reduction of the magnetic particles.

Accordingly, the present inventor conducted further research. He made the unprecedented discovery that both particle size reduction and coercive force adjustment (coercive force reduction) could be achieved by preventing sintering of the magnetic particles during heating by conducting adhering on the magnetic particles with a glass component before the coercive force-reducing treatment accompanied by heating. The present invention was devised on that basis.

Conventionally, a sintering inhibitor in the form of silica, which is one of glass components, has been employed. For example, such is proposed in Japanese Unexamined Patent Publication (KOKAI) No. 2008-277726, which is expressly incorporated herein by reference in its entirety. The conventional techniques, including that disclosed in the above publication, have required for the particles to be completely covered with the sintering inhibitor. However, when the surface of the magnetic particles is completely covered with a glass component, it is difficult for the coercive force-reducing effect that is conducted after adhering with the glass component to produce its effect on the magnetic particles. As a result, it becomes either difficult or impossible to lower the coercive force of the magnetic particles.

Accordingly, in a desirable embodiment of the present invention, the glass component adheres on the magnetic particles to a degree that does not hinder the coercive force-reducing treatment. That is, in a desirable embodiment of the present invention, the entire surface of the magnetic particles is not fully covered with the glass component. The glass component is partially coated on the surface of the magnetic particles, for example, in a sea/island form (a state where the glass component adheres in the form of multiple islands on the surface (sea) of the magnetic particles). As a result, magnetic particles with reduced coercive force relative to the starting material magnetic particles can be readily obtained. A size reduction can also be achieved in the magnetic particles thus obtained relative to magnetic particles obtained by conducting a coercive force-reducing treatment accompanied by heating without applying adhering with the glass component. This can be the result of sintering of the particles due to heating during the coercive force-reducing treatment having been prevented by the presence of the glass component.

An aspect of the present invention relates to a method of manufacturing magnetic particles, wherein the magnetic particles are magnetic particles for magnetic recording, and the method comprises:

subjecting starting material magnetic particles to glass component-adhering treatment to be adhered with a glass component; and subjecting the magnetic particles after the glass component-adhering treatment to coercive force-reducing treatment with heating, to provide magnetic particles having lower coercive force than the starting material magnetic particles.

In an embodiment, in the glass component-adhering treatment, the surface of the starting material magnetic particles is partially coated with the glass component.

In an embodiment, the starting material magnetic particles are ferrite magnetic particles.

In an embodiment, the glass component is a hydrolysis product of a silicon compound.

In an embodiment, the silicon compound is alkoxysilane.

In an embodiment, the above method comprises admixing a precursor of the glass component to a solution comprising the starting material magnetic particles to subject the starting material magnetic particles to adhering with the glass component in the form of a hydrolysis product of the precursor.

In an embodiment, the above method further comprises a step of removing the glass component from the surface of the magnetic particles after the coercive force-reducing treatment.

In an embodiment, the glass component is dissolved and removed with alkali.

In an embodiment, the coercive force-reducing treatment is conducted by heat treating the magnetic particles in a reducing atmosphere after the glass component-adhering treatment.

In an embodiment, the reducing atmosphere comprises reducing gas selected from the group consisting of hydrogen gas and hydrocarbon gas.

In an embodiment, the above method further comprises, before the heat treatment, subjecting the magnetic particles after the glass component-adhering treatment to adhering with a transition metal salt on the surface of the magnetic particles.

In an embodiment, the coercive force-reducing treatment is conducted by subjecting the magnetic particles after the glass component-adhering treatment to adhering with a transition metal-containing organic compound on the surface of the magnetic particles then thermally decomposing the compound.

In an embodiment, the thermal decomposition is conducted by gas phase thermal decomposition.

In an embodiment, the transition metal-containing organic compound is a transition metal complex comprising a ligand in the form of an acetyl acetonate compound.

In an embodiment, the starting material magnetic particles are hexagonal ferrite magnetic particles.

In an embodiment, the starting material magnetic particles are ε-iron oxide particles.

In an embodiment, the starting material magnetic particles have coercive force of equal to or greater than 230 kA/m.

In an embodiment, the magnetic particles provided through the coercive force-reducing treatment with heating have a particle size ranging from 8 nm to 30 nm.

A further aspect of the present invention relates to magnetic particles for magnetic recording provided by the above method.

An aspect of the present invention can provide fine magnetic particles for magnetic recording having coercive force suited to recording.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

An aspect of the present invention relates to a method of manufacturing magnetic particles, wherein the magnetic particles are magnetic particles for magnetic recording (also referred to as "magnetic recording-use magnetic particles", hereinafter).

The above method of manufacturing magnetic recording-use magnetic particles (also referred to as a "method of manufacturing magnetic particles" or "manufacturing method", hereinafter) comprises:

subjecting starting material magnetic particles to glass component-adhering treatment to be adhered with a glass component; and subjecting the magnetic particles after the glass component-adhering treatment to coercive force-reducing treatment with heating, to provide magnetic particles having lower coercive force than the starting material magnetic particles.

As set forth above, manufacturing magnetic particles through the above steps makes it possible to obtain fine magnetic recording-use magnetic particles with lower coercive force than the starting material magnetic particles.

The method of manufacturing magnetic particles of an aspect of the present invention will be described in greater detail below.

Starting Material Magnetic Particles

The various magnetic particles that are employed in magnetic recording can be employed as the starting material magnetic particles. Among these, the use of magnetic particles with high crystal magnetic anisotropy that are capable of exhibiting high thermal stability even with particle size reduction to achieve higher density recording (high Ku magnetic particles with a high anisotropic constant Ku) is desirable. Examples of such magnetic particles are noble metals such as FePt, rare earth metals such as NdFeB, nitrides such as $Fe_{16}N_2$, and ferrite magnetic particles such as hexagonal ferrite and ε-iron oxide.

However, high Ku magnetic particles have high coercive force that conventionally makes it difficult to write information, resulting in poor recording properties. By contrast, an aspect of the present invention makes it possible to obtain magnetic particles of lower coercive force than the starting material magnetic particles, permitting improvement in the recording properties of the magnetic particles.

The use of starting material magnetic particles in the form of fine magnetic particles that are suitable as magnetic material with a particle size of 8 nm to 30 nm in high density recording-use magnetic recording media is desirable. The particle size preferably falls within a range of 8 nm to 20 nm. An aspect of the present invention can provide fine magnetic recording-use magnetic particles having coercive force that is suited to recording by reducing the coercive force while preventing the sintering of the starting material magnetic particles.

The particle size in the present invention is the value measured by the following method.

The particles are photographed at 100,000-fold magnification with a model H-9000 transmission electron microscope made by Hitachi and printed on photographic paper at an overall magnification of 500,000-fold to obtain a particle photograph. The targeted particles are selected in the particle photograph, the contours of the particles are traced with a digitizer, and the particle size is measured with KS-400 Carl Zeiss image analysis software. For powder gathering particles, the size of 500 particles is measured and the average value of the particle size is adopted as the particle size (average particle size) of the particles.

In the present invention, the size of the particles or powder of magnetic particles or the like (referred to as the "particle size", hereinafter), (1) is given by the length of the major axis of the particle, that is, the major axis length when the particles are acicular, spindle-shaped, cylindrical in shape (with the height being greater than the maximum major diameter of the bottom surface), or the like; (2) is given by the maximum major diameter of the plate surface or bottom surface when the particles are tabular or cylindrical in shape (with the thickness or height being smaller than the maximum major diameter of the plate surface or bottom surface); and (3) is given by the diameter of a circle of equal perimeter when the particles are spherical, polyhedral, or of indeterminate shape, and the major axis of the particle cannot be specified based on the shape. The term "diameter of a circle of equal perimeter" can be obtained by circular projection.

The average particle size of the particles is the arithmetic average of the above particle size and is obtained by measuring 500 primary particles, as set forth above. The term "primary particle" refers to an independent particle that has not aggregated.

The average acicular ratio of the particles refers to the arithmetic average of the value of the (major axis length/ minor axis length) of each particle, obtained by measuring the length of the minor axis of the particles in the above measurement, that is, the minor axis length. The term "minor axis length" means the length of the minor axis constituting a particle for a particle size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in particle size definition (1) above, the average particle size refers to the average major axis length. For definition (2) above, the average particle size refers to the average plate diameter, with the arithmetic average of (maximum major diameter/thickness or height) being referred to as the average plate ratio. For definition (3), the average particle size refers to the average diameter (also called the average particle diameter).

Shape anisotropy increases in the order (2), (3), (1). Simply selecting the one with the great shape anisotropy when orienting the easy axis of magnetization in-plane is desirable from the perspective of reducing the particle size. Additionally, when orienting the easy axis of magnetization perpendicular to the plane for perpendicular recording, it is better to consider the flow orientation of the coating and the like. Thus, desirability corresponds to the order (2), (1), (3). Additionally, from the perspective of thermal stability, form (3) is desirable for $\epsilon$-iron oxide, described further below, and a spherical shape is preferred.

From the perspective of thermal stability, use of the above-described various high Ku magnetic particles as the starting material magnetic particles is desirable. The magnetic characteristics of the magnetic particles are: coercive force Hc at 25° C. of high Ku magnetic particles with good thermal stability of normally equal to or greater than 230 kA/m, even equal to or greater than 240 kA/m, and for example, falling within a range of about 240 kA/m to 1,600 kA/m.

Glass Component-Adhering Treatment

Adhering of the glass component on the starting material magnetic particles can be conducted by a dry method or a wet method. From the perspective of facilitating the glass component-adhering treatment, a wet method is desirable. The glass component preferably adheres on the magnetic particles in a step of obtaining ferrite magnetic particles by the coprecipitation method or the reverse micelle method.

Specific embodiments of methods of adhering with the glass component by a wet method will be described below for ferrite magnetic particles in the form of hexagonal ferrite and $\epsilon$-iron oxide.

(i) Example of Preparing Hexagonal Ferrite Magnetic Particles Adhered with a Glass Component In the coprecipitation method, an aqueous solution in which a water-soluble salt of a metal element (such as iron, an alkaline earth metal, or Co) that is required for constituting ferrite and, as needed, a water-soluble salt of an element (such as Ti or Zn) for controlling the coercive force, is mixed with an alkali aqueous solution and the iron salt and the alkaline earth metal salt (and the salts of elements that are optionally added as set forth above) are coprecipitated.

Additionally, in the reverse micelle method, a surfactant and an organic solvent that is immiscible with water are added to an aqueous solution in which salts of metal elements required to constitute ferrite have been dissolved, and a W/O emulsion is formed. An alkali is then added to induce coprecipitation, yielding the coprecipitation product of an iron salt and an alkaline earth metal salt. In the reverse micelle method, it is possible to control the particle size of the coprecipitate by means of the mixing ratio of surfactant and water, for example.

Examples of the above water-soluble salts are nitrates and chlorides. Examples of alkalis are sodium hydroxide, potassium hydroxide, and sodium carbonate.

Both the coprecipitation method and reverse micelle method are known methods of manufacturing hexagonal ferrite. In an aspect of the present invention, as well, particles (coprecipitates) containing iron salts and alkaline earth metal salts can be obtained by known techniques. The types of iron salts and alkaline earth metal salts contained in the particles are determined by the type of water-soluble salt employed. For example, the use of iron (III) nitrate and alkaline earth metal nitrates makes it possible to obtain a coprecipitate containing an iron salt in the form of iron hydroxide and an alkaline earth metal salt in the form of a carbonate. Barium ferrite can be obtained by employing an alkaline earth metal in the form of barium. Strontium ferrite can be obtained by employing strontium. And calcium ferrite can be obtained by employing calcium.

As set forth further below, the particles are subjected to adhering with a glass component in an aspect of the present invention. Since alkaline earth metals tend to readily incorporate into glass, the addition of an alkaline earth metal in a quantity in excess of the stoichiometric composition, such as one-fold to five-fold the stoichiometric composition, is desirable, and the addition of an alkaline earth metal in a quantity of 1.5-fold to 4-fold the stoichiometric composition is preferred.

Calcination after adhering with the glass component can be conducted at a calcination temperature of 500° C. to 1,000° C., for example. In the present preparation example, techniques that are known with regard to coprecipitation methods and reverse micelle methods can be applied in the calcination and subsequent steps.

For details regarding coprecipitation methods, reference can be made to, for example, Japanese Unexamined Patent Publication (KOKAI) No. 2010-1171, paragraphs [0043] to [0050] and Examples 1 to 5; Japanese Unexamined Patent Publication (KOKAI) Heisei No. 4-32005, column 4, line 37 to column 6, line 31 and Examples; and with regard to reverse micelle methods, to the description in Japanese Unexamined Patent Publication (KOKAI) Heisei No. 3-204909, page 2, lower left column, line 3 to page 3, lower left column, line 12 and Examples; and Japanese Unexamined Patent Publication (KOKAI) No. 2007-91517, paragraphs [0011] to [0024], paragraphs [0027] to [0030], and Examples. The contents of the above publications are expressly incorporated herein by reference in their entirety.

In the present preparation example, the particles containing the iron salt and alkaline earth metal salt set forth above are subjected to adhering with a glass component. The adhering with the glass component is desirably conducted in a solvent to facilitate adhering. For example, a glass component in the form of the hydrolysis product of a glass component precursor can adhere on particles by admixing the glass component precursor to a solution containing particles comprising an iron salt and an alkaline earth metal salt. When obtaining the particles by a coprecipitation method or a reverse micelle method, by adding the precursor to a solution in which the particles have been coprecipitated (precipitated), the glass component can be precipitated onto the surface of the particles by what is known as the sol-gel method. An example of a precursor that is suitable for adhering with a glass component on particles is a silicon compound. The use of a silane compound such as alkoxysilane as the silicon compound is desirable. Silica ($SiO_2$) can adhere on the surface of the particles by hydrolysis of a silane compound. Among these, the use of tetraethyl orthosilicate (TEOS), which is capable of forming silica by the sol-gel method, is desirable.

When the particles end up being completely covered by the glass component, the formation of hematite may take place preferentially over the formation of ferrite in calcination, and hematite, not hexagonal ferrite magnetic particles, may end up forming. In an aspect of the present invention, the term "hexagonal ferrite magnetic particles" refers to particles in which hexagonal ferrite is detected as the primary component by X-ray diffraction analysis. In this context, the phrase "particles in which hexagonal ferrite is detected as the primary component" means that the peak exhibiting the greatest strength is derived from the crystalline structure of hexagonal ferrite.

The reasons why the formation of hematite may occur preferentially when the particles are completely covered by the glass component are presumed to be the following.

For example, barium ferrite magnetic particles can be obtained by subjecting particles containing iron hydroxide and barium carbonate to calcination. In calcination, $Fe(OH)_2$ oxidizes, producing FeO. The $BaCO_3$ breaks down, producing BaO and $CO_2$. The FeO and BaO that have been produced then combine into barium ferrite. However, in the synthesis of hexagonal ferrite, when the particles have been completely covered with the glass component, the $CO_2$ that is produced ends up remaining in the reaction system. That may hinder progression of the reaction producing BaO from $BaCO_3$, and is thought to be the reason for the preferential production of hematite. Similarly, when particles containing other iron salts and other alkaline earth metal salts are subjected to calcination, hindering of the decomposition reaction of the alkaline earth metal salt is presumed to impede the formation of ferrite. In the synthesis of hexagonal ferrite, there is known to be a dependence on the partial oxygen pressure. When the particles have been completely covered with a glass component, oxygen is no longer supplied, which is presumed to hinder the synthesis of hexagonal ferrite.

Accordingly, in the present preparation example the surface of the particles is covered with a quantity of glass component that permits obtaining a calcination product in which hexagonal ferrite is detected as the principal component in X-ray diffraction analysis. When the particles are covered with the glass component so that portions of the particles remain uncovered, for example, in the reaction system set forth above, the $CO_2$ that is produced can exit the reaction system via the uncovered portions without hindering the reaction producing BaO from $BaCO_3$. As a result, it becomes possible to obtain a calcination product in which hexagonal ferrite is detected as the principal component by X-ray diffraction analysis. For example, the addition to the solution of a glass component precursor in a quantity falling within a range of 0.05 mol percent to 0.4 mol percent per mol of iron present in the solution (including that contained in the particles and that contained in the solution) makes it possible to obtain particles having portions that have not been covered with the glass component. Adhering with the glass component in this manner and conducting heating in the coercive force-reducing treatment in an aspect of the present invention can inhibit the sintering of magnetic particles and the formation of coarse particles.

The particles on which the glass component has adhered are desirably washed and dried by air drying or the like before calcination. As described in Japanese Unexamined Patent Publication (KOKAI) No. 2007-91517, paragraph [0024], washing can be conducted with a mixed solvent of water and a primary alcohol. Washing can also be conducted with some other organic solvent.

Subsequently, the dried particles are subjected to an optional comminution step and then subjected to calcination. Conducting a comminution step can permit uniform calcination and can facilitate removal of the glass component, which may be finally conducted.

As set forth above, a technique that is known with regard to coprecipitation methods or reverse micelle methods can be applied in calcination. After calcination, hexagonal ferrite is detected as the principal component of the particles by X-ray diffraction analysis.

The hexagonal ferrite magnetic particles thus obtained are subjected to a coercive force-reducing treatment with heating, set forth further below. Since the particles are not completely covered with the glass component so as to cause the formation of hexagonal ferrite to take place preferentially, the adjustment of the coercive force may not be impeded by the presence of the glass component and the coercive force of the magnetic particles can be readily reduced.

(ii) Example of Preparing ε-Iron Oxide Magnetic Particles on Which Glass Component Adheres A method based on the reverse micelle method is desirably employed to prepare ε-iron oxide. The method of preparing ε-iron oxide based on the reverse micelle method can comprise:

(1) a step of preparing iron salt particles in the form of a precursor of ε-iron oxide (also referred to as "precursor particles", hereinafter);
(2) a step of covering the precursor particles with a glass component, desirably by the sol-gel method; and
(3) a step of heating and calcination of the precursor particles that have been covered with the glass component. In this manner, ε-iron oxide magnetic particles can be obtained by converting the precursor particles by heating and calcination. On the ε-iron oxide magnetic particles thus obtained, the glass component, that adheres on the precursor particles in step (2), adheres.

Each of these steps will be described in turn.

In step (1), the iron salt particles of precursor are precipitated from the micelle solution by the reverse micelle method. More specifically, a surfactant and an organic solvent that is immiscible with water are added to an aqueous solution of a water-soluble salt of iron to form a W/O emulsion. To this is added alkali to precipitate the iron salt. For example, the blending ratio of surfactant and water can be used to control the particles size of the iron salt that precipitates. By conducting heating and calcination after adhering on the precursor particles with a glass component, described further below, it is possible to prevent the sintering of ε-iron oxide particles to form coarse particles. Accordingly, the particle size of the ε-iron oxide particles that are finally obtained can be controlled primarily by the particle size of the iron salt particles that precipitate.

Iron nitrates and chlorides are examples of the above water-soluble salt. Sodium hydroxide, potassium hydroxide, sodium carbonate, and ammonia water are examples of alkali. The magnetic characteristics of the ε-iron oxide can be controlled by substituting other elements for some of the iron. Examples of substitution elements are Al, Ga, In, Co, Ni, Mn, Zn, and Ti. Such a substituted ε-iron oxide can be employed as the starting material magnetic particles. When obtaining a substituted ε-iron oxide by the reverse micelle method, it suffices to add the substitution element compounds (such as nitrates and hydroxides) to the micelle solution in step (1).

Step (2) is a step in which a glass component adheres on the surface of the precursor particles before heating and calcination to prevent sintering of the particles and the formation of coarse particles in step (3). From the perspective of uniformly covering the glass component on the surface of the precursor particles, the glass component is desirably covered on the surface of the precursor particles by the sol-gel method. Here, it is desirable not to completely cover the precursor particles with the glass component. That is because the glass component that is covered here remains on the surface of the ε-iron oxide magnetic particles obtained after heating and calcination. When the particles are completely covered with the glass component, it is not easy to lower the coercive force of the magnetic particles through the coercive force-reducing treatment that is subsequently conducted.

Thus, for example, it is desirable to add the glass component precursor to the solution in a quantity falling within a range of 0.05 mol percent to 0.4 mol percent per mol of iron (including that contained in the particles and that contained in the solution) that is present in the solution. The glass component and its precursor that are employed in the present preparation example are as described in the preparation example relating to the hexagonal ferrite magnetic particles above.

The precursor particles that have been covered with the glass component can be washed to remove unreacted material (such as the above silane compound) from the surface of the precursor particles before step (3). The washing can be conducted with water, an organic solvent, or a mixed solvent thereof.

The precursor particles that have been covered with the glass component as set forth above can be, as needed, removed from the solution, washed, dried, comminuted, and the like, and then subjected to heating and calcination in step (3). Comminution can permit uniform calcination and can facilitate the removal of the sintering inhibitor after calcination.

The heating and calcination in step (3) can be conducted at an atmospheric temperature of 500° C. to 1,500° C., for example. By way of example, heating and calcination of the precursor particles at the above atmospheric temperature in air can convert the precursor particles to ε-iron oxide by means of an oxidation reaction or the like.

On the ε-iron oxide magnetic particles thus obtained, a glass component desirably adheres in step (2) to a degree that does not hinder coercive force adjustment in the coercive force-reducing treatment, described further below.

As set forth above, the method of admixing the glass component precursor to the solution containing the starting material magnetic particles and stirring the mixture to subject the starting material magnetic particles to adhering with the glass component, which is a hydrolysis product of the precursor, can be conducted in a process in the coprecipitation method or reverse micelle method. It is thus desirable from the perspectives of process simplification and workability. However, the above method is not limited to embodiments that are applied in the steps of the coprecipitation method and the reverse micelle method. The glass component-adhering treatment can be conducted on magnetic particles that have been prepared by the coprecipitation method, reverse micelle method, or some other preparation method.

The glass component-adhering treatment in an aspect of the present invention is not limited to the specific embodiments set forth above. So long as it is a method that permits adhering with the glass component on the magnetic particles before conducting the coercive force-reducing treatment with heating, any method can be employed without restriction.

Coercive Force-Reducing Treatment

In an aspect of the present invention, magnetic particles on which a glass component has adhered by the above glass component-adhering treatment are subjected to a coercive force-reducing treatment. The coercive force-reducing treatment that is conducted here is a treatment that is accompanied by heating. Thus, it is difficult to obtain fine magnetic particles without a glass component adhering. That is because the particles may sinter and aggregate during heating, forming coarse particles. By contrast, in an aspect the present invention, the presence of the glass component that has adhered on the magnetic particles before the coercive force-reducing treatment can reduce or prevent sintering, thereby making it possible to simultaneously achieve a reduction in coercive force and a reduction in particle size.

Examples of specific embodiments of the coercive force-reducing treatment accompanied by heating are given in Embodiments A and B below.

(Embodiment A) An embodiment in which the magnetic particles after the glass component-adhering treatment are heat treated in a reducing atmosphere (also referred to as a "heat reduction treatment", hereinafter).

(Embodiment B) An embodiment in which a transition metal-containing organic compound adheres on the surface of the magnetic particles after the glass component-adhering treatment, after which the transition metal-containing organic compound is thermally decomposed.

Embodiments A and B will be described in turn below.

(i) Specific Embodiment A of the Coercive Force-Reducing Treatment

In Embodiment A, the magnetic particles after the glass component-adhering treatment are subjected to a heating and reducing treatment to obtain magnetic particles exhibiting lower coercive force than the starting material magnetic particles. An example of the heating and reducing treatment is the method of heating the magnetic particles, after the glass component-adhering treatment, in a reducing atmosphere containing a hydrocarbon gas. For details regarding this method, reference can be made to Japanese Unexamined Patent Publication (KOKAI) No. 2012-160486, paragraphs [0019] to [0021], and Examples of that publication. The content of the above publication is expressly incorporated herein by reference in its entirety.

An another example of Embodiment A is the method of heating the magnetic particles, after the glass component-adhering treatment, in a reducing atmosphere containing hydrogen gas. For details regarding this method, reference can be made to Japanese Unexamined Patent Publication (KOKAI) No. 2012-169026, paragraphs [0022] to [0024], and to Examples of that publication. The content of the above publication is expressly incorporated herein by reference in its entirety. In the technique described in Japanese Unexamined Patent Publication (KOKAI) No. 2012-169026, the main object is to adjust the saturation magnetization. The heating and reduction conditions for the heating and reduction treatment corresponding to the first region described in paragraph 0013 of that publication are controlled. By contrast, in an aspect of the present invention, so long as the coercive force is reduced, it is possible to conduct a heating and reducing treatment corresponding to not just the first region, but to other regions, such as the second region, as well.

The reducing atmosphere in which the heating and reducing treatment is conducted is not limited to containing the hydrocarbon gas or hydrogen gas set forth above. It can be an atmosphere containing another reducing gas, such as carbon monoxide.

Another example of the heating and reducing treatment is the method of adhering with a transition metal salt on the surface of the magnetic particles after the glass component-adhering treatment and before the heating and reducing treatment. For details regarding this method, reference can be made to the description in Japanese Unexamined Patent Publication (KOKAI) No. 2011-216838, paragraphs [0039] to [0053], and Examples of that publication. The content of the above publication is expressly incorporated herein by reference in its entirety. The magnetic particles that are subjected to treatment by this method can be of the core/shell structure in which a soft magnetic material (shell) adheres on the surface of a core in the form of a hard magnetic particle, as is described in Japanese Unexamined Patent Publication (KOKAI) No. 2011-216838, paragraphs [0029] to [0038]. The core/shell structure that is referred to in the present specification includes forms in which the entire surface of the core is covered with the shell, and forms in which the surface of the core is partially covered with the shell, desirably in a sea/island form. As described in the above publication, the exchange coupling of a hard magnetic particle and a soft magnetic material can contribute to reducing the coercive force of the magnetic particle. In this form, direct contact between the magnetic particle and the transition metal salt is presumed to contribute greatly to reducing the coercive force. Accordingly, when the entire surface of the magnetic particle ends up being covered with the glass component by the glass component-adhering treatment, reducing the coercive force through subsequent processing is thought to be difficult. Accordingly, when conducting the coercive force-reducing treatment in the present form, the glass component is desirably covered so that the surface of the magnetic particles is partially covered in the glass component-adhering treatment. By contrast, in forms in which the magnetic particles after the glass component-adhering treatment are subjected to the coercive force-reducing treatment without having been covered with a transition metal salt, it is also possible to cover the entire surface of the magnetic particles with the glass component in the glass component-adhering treatment. However, the reducing treatment conditions for the magnetic particles through the glass component should be intensified, desirably by modifying the outer layer portion to reduce the coercive force of the magnetic particles. Accordingly, from the perspective of facilitating coercive force reduction, the glass component-adhering treatment desirably does not cover the entire surface of the magnetic particles with the glass component, but only some portion of it.

(ii) Specific Embodiment B of the Coercive Force-Reducing Treatment

In Embodiment B, a transition metal-containing organic compound adheres to the surface of the magnetic particles after the glass component-adhering treatment, after which the transition metal-containing organic compound is thermally decomposed to obtain magnetic particles exhibiting lower coercive force than the starting material magnetic particles. The transition metal-containing organic compound that adheres to the surface of the magnetic particles can be, for example, a transition metal complex with a ligand in the form of an acetyl acetonate compound. The thermal decomposition can be conducted using a gas phase or liquid phase, and is desirably conducted using a gas phase.

For details regarding this embodiment, reference can be made to Japanese Unexamined Patent Publication (KOKAI) No. 2012-27978, paragraphs [0028] to [0046], and to Examples of the above publication. The magnetic particles that are subjected to treatment in this embodiment can have a core/shell structure where a shell in the form of a thermal decomposition product of the above organic compound is present on the surface of a core in the form of a hard magnetic particle, as is described in Japanese Unexamined Patent Publication (KOKAI) No. 2012-27978, paragraphs [0008] and [0044]. The content of the above publication is expressly incorporated herein by reference in its entirety. As described in that publication, exchange coupling of the core and the shell in the core/shell structure is presumed to contribute to a reduction in the coercive force of the magnetic particles. In this embodiment, as well, direct contact between the magnetic particles and the transition metal-containing organic compound is presumed to contribute greatly to coercive force reduction. Accordingly, when the entire surface of the magnetic particles ends up being covered by the glass component in the glass component-adhering treatment, reduction of the coercive force in subsequent processing is thought to be difficult. Accordingly, when conducting a coercive force-reducing treatment in the present embodiment, it is desirable for the glass component to adhere so that the surface of the magnetic particles is partially covered in the glass component-adhering treatment.

By conducting the above processing, magnetic recording-use magnetic particles having coercive force that is suited to recording and that is lower than the coercive force of the starting material magnetic particles can be obtained. From the perspective of achieving both recording properties and recording retention properties (thermal stability), the coercive force of the magnetic particles thus obtained, while being lower than the starting material magnetic particles, is for example equal to or greater than 80 kA/m but less than 240 kA/m, desirably equal to or greater than 80 kA/m but less than 230 kA/m, and preferably, equal to or greater than 160 kA/m but less than 230 kA/m.

The magnetic particles after the above coercive force-reducing treatment can be optionally subjected to a glass component removal treatment. The glass component can be dissolved and removed by, for example, a method of immersing the particles in an alkali solution such as sodium hydroxide (alkali washing) or with hydrofluoric acid (HF) or the like. Hydrofluoric acid is not easy to handle, so alkali washing is desirably employed.

A further aspect of the present invention relates to magnetic recording-use magnetic particles provided by the manufacturing method of an aspect of the present invention set forth above.

The magnetic recording-use magnetic particles of an aspect of the present invention exhibit coercive force that is lower than that of the starting material magnetic particles due to the coercive force-reducing treatment accompanied by heating. By preventing sintering of the particles in the coercive force-reducing treatment accompanied by heating by means of the glass component, the formation of large coarse particles can be inhibited. As a result, a particle size that is close to that of the starting material magnetic particles can be achieved. The magnetic recording-use magnetic particles of an aspect of the present invention can be of a particle size that is similar to that of the starting material magnetic particles. For example, they can have a particle size that falls within a range of 8 nm to 30 nm, and can have a particle size that falls within a range of 8 nm to 20 nm.

A magnetic layer can be formed by coating on a support a coating material obtained by mixing the magnetic recording-use magnetic particles of an aspect of the present invention with binder and solvent. Accordingly, the magnetic recording-use magnetic particles of an aspect of the present invention are suited to the use in particulate magnetic recording media. That is, use of the magnetic recording-use magnetic particles of an aspect of the present invention makes it possible to obtain a magnetic recording medium comprising a magnetic layer containing ferromagnetic powder and binder on a nonmagnetic support, with the ferromagnetic powder being the magnetic recording-use magnetic particles of an aspect of the present invention. The above magnetic recording medium can have a multilayered structure sequentially comprising, on a nonmagnetic support, a nonmagnetic layer containing nonmagnetic powder and binder; and a magnetic layer containing the magnetic recording-use magnetic particles of an aspect of the present invention and binder. It can also have a backcoat layer on the opposite side of the nonmagnetic support from the magnetic layer. In using the magnetic recording-use magnetic particles of an aspect of the present invention to manufacture a magnetic recording medium, it is possible to apply known techniques relating to magnetic recording media.

The present invention will be described in detail below based on Examples. However, the present invention is not limited to Examples. The term "percent" given in Examples is weight percent and the ratio given in Examples is a weight ratio.

A. Preparation of Barium Ferrite on Which Silica Adhered
[Procedure 1: Preparation of Micelle Solution]

Micelle solution I and micelle solution II were prepared by the following methods.
(1) Preparation of Micelle Solution I To 10.46 g of iron (III) nitrate nonahydrate, 0.846 g of barium nitrate, and 123.7 g of cetyltrimethylammonium bromide was added 207.9 g of pure water, followed by 439.8 g of n-octane and 101.2 g of 1-butanol, and the mixture was stirred and dissolved.
(2) Preparation of Micelle Solution II To 247.5 g of cetyltrimethylammonium bromide were added 178.5 g of 10 percent ammonia water and 255.2 g of pure water, followed by 879.6 g of n-octane and 202.3 g of 1-butanol, and the mixture was stirred and dissolved.
[Procedure 2: Forming a Coprecipitate]

Ten minutes before mixing with micelle solution I, 8.2 g of sodium carbonate was added to micelle solution II. Stirred micelle solution I was then added dropwise with stirring. When the dropwise addition had ended, the mixture was stirred for another 30 minutes.
[Procedure 3: Hydrolyzing the Glass Component Precursor]

The mixed solution obtained in procedure 2 contained a coprecipitate of iron hydroxide $Fe(OH)_2$ and barium carbonate $BaCO_3$. The iron contained in the micelle solution was thought to have been incorporated in its entirety into the coprecipitate because an excess quantity of ammonia was contained in the micelle solution and because the solubility of iron hydroxide is relatively low.

While stirring the mixed solution, a quantity of tetraethoxysilane (TEOS) corresponding to 0.14 mol per mol of iron in the solution was added and stifling was continued for about a day under the same conditions. This caused the TEOS to undergo hydrolysis and for silica to adhere on the surface of the precipitate in the mixed solution.
[Procedure 4: Washing]

The solution obtained in procedure 3 was placed in a separating funnel, 200 mL of a 1:1 mixed solution of pure water and ethanol was added, and the mixture was left standing to await the separation of a reddish brown portion from the rest. Everything but the reddish brown portion was discarded. This operation was repeated three times, after which the solution was placed in a centrifuge and centrifuged.

The precipitate that had been obtained by the above processing was collected. The collected precipitate was redispersed in a mixed solution of chloroform and ethanol and centrifuged. The precipitate that was obtained was collected.

[Procedure 5: Calcination]

The precipitate obtained in procedure 4 was air dried and then crushed in a mortar. Subsequently, it was subjected to heat treatment for 5 minutes at an 800° C. internal furnace temperature while feeding 1 L/min of oxygen in an image furnace made by ULVAC-Riko.

Barium ferrite magnetic particles on the surfaces of which silica adhered were obtained by the above steps. The particles obtained were subjected to powder X-ray diffraction analysis with an X' Pert PRO made by PANalytical Corp. (CuKα radiation source, 45 kV voltage, 40 mA current) and the principal component was determined to be hexagonal ferrite.

B. Preparation of Unsubstituted ε-Iron Oxide on Which Silica Adhered

[Procedure 1: Preparation of Micelle Solution]

Two micelle solutions in the form of micelle solution I and micelle solution II were prepared by the following methods.

(1) Preparation of Micelle Solution I

To 10.46 g of iron (III) nitrate and 123.7 g of cetyltrimethylammonium bromide was added 207.9 g of pure water, followed by 439.8 g of n-octane and 101.2 g of 1-butanol, and the solution was stirred and dissolved.

(2) Preparation of Micelle Solution II

To 123.7 g of cetyltrimethylammonium bromide were added 178.5 g of 10 percent ammonia water, 439.8 g of n-octane, and 101.2 g of 1-butanol, and the mixture was stirred and dissolved.

[Procedure 2: Precipitation of Precursor Particles]

Micelle solution II was added dropwise to micelle solution I with stifling. When the dropwise addition had ended, the mixture was stirred for another 30 minutes.

[Procedure 3: Hydrolysis of Glass Component Precursor]

Precursor particles in the form of iron hydroxide $Fe(OH)_2$ were precipitated in the mixture obtained in procedure 2. While stirring the mixture, 48.9 g of tetraethoxysilane (TEOS) was added. Stirring was continued under the same conditions for about a day. This hydrolyzed the TEOS, causing silica to adhere on the surface of the precursor particles in the mixture.

[Procedure 4: Washing]

The solution obtained in procedure 3 was placed in a separating funnel, 200 mL of a 1:1 mixed solution of pure water and ethanol was added, and the mixture was left standing to await the separation of a reddish brown portion from the rest. Everything but the reddish brown portion was discarded. This operation was repeated three times, after which the solution was placed in a centrifuge and centrifuged. The precipitate that had been obtained by this processing was collected. The collected precipitate was redispersed in a mixed solution of chloroform and ethanol and centrifuged. The precipitate that was obtained was collected.

[Procedure 5: Heating and Sintering]

The precipitate obtained in procedure 4 was air dried and then crushed in a mortar. Subsequently, it was subjected to heat treatment for 2 hours at a 1,030° C. internal furnace temperature while feeding 1 L/min of oxygen in an image furnace made by ULVAC-Riko. ε-iron oxide particles on the surfaces of which silica adhered were thus obtained. The particles obtained were subjected to powder X-ray diffraction analysis with an X' Pert PRO made by PANalytical Corp. (CuKα radiation source, 45 kV voltage, 40 mA current) and the principal component was determined to be ε-iron oxide.

C. Preparation of Al-Substituted ε-Iron Oxide on Which Silica Adhered

With the exceptions that micelle solution I in procedure I was prepared by the following method, the internal furnace temperature in procedure 5 was 1,050° C., and the heat treatment period was 1 hour, Al-substituted ε-iron oxide powder in which a portion of the Fe was replaced with Al was obtained by the same method as in B. above.

<Preparation of Micelle Solution I>

To 8.37 g of iron (III) nitrate nonahydrate, 1.94 g of aluminum nitrate, and 123.7 g of cetyltrimethylammonium bromide were added 207.9 g of pure water, followed by 439.8 g of n-octane and 101.2 g of 1-butanol, and the mixture was stirred and dissolved.

D. Preparation of Magnetic Particles without Glass Component Adhering (Silica Removed)

Barium ferrite magnetic particles on the surfaces of which silica adhered that had been obtained in A. (Preparation of barium ferrite on which silica adhered) above were stirred for 24 hours in an aqueous solution of 3 mol/L of sodium hydroxide to remove the silica from the particle surface. Next, centrifugal separation was conducted, the precipitate was collected, the precipitate was redispersed in pure water, and the mixture was centrifugally separated to conduct washing. Subsequently the mixture was air dried.

The barium ferrite magnetic particles on the surfaces of which silica adhered that had been obtained in A. above were subjected to the coercive force-reducing treatment set forth further below and then subjected to the above treatment to remove the silica from the surface.

E. Preparation of Magnetic Particles without Glass Component Adhering (Silica Removed)

One gram of the unsubstituted ε-iron oxide particles on the surfaces of which silica adhered that had been obtained in B. (Preparation of unsubstituted ε-iron oxide on which silica adhered) above were placed in 25 cc of a 5 N sodium hydroxide aqueous solution and treated for four hours while applying ultrasound at a temperature of 70° C. Subsequently, the mixture was stirred for a day and a night. In this manner, the silica was removed from the surface of the ε-iron oxide particles.

Subsequently, water washing and centrifugal separation were repeatedly conducted. Washing was conducted until the supernatant dropped lower than pH 8, at which point air drying was conducted.

The unsubstituted ε-iron oxide particles, on the surface of which silica adhered, that had been obtained in B. above were subjected to the coercive force-reducing treatment set forth further below and then subjected to the above treatment to remove the silica from the surface.

F. Preparation of Magnetic Particles without Glass Component Adhering (Silica Removed)

Al-substituted ε-iron oxide particles, on the surfaces of which silica adhered, that had been obtained in C. (Preparation of Al-substituted ε-iron oxide on which silica adhered) above were subjected to the same treatment as in E. above to obtain ε-iron oxide particles with surfaces from which the silica had been removed.

The Al-substituted ε-iron oxide particles, on the surface of which silica adhered, that had been obtained in C. above were subjected to the coercive force-reducing treatment set forth further below and then subjected to the above treatment to remove the silica from the surface.

G. Coercive Force-Reducing Treatment by Hydrogen Reduction

The magnetic particles to be treated were heat treated in pure hydrogen gas flow in a reaction furnace. In the reduction treatment, reacted gas was discharged through an exhaust outlet while constantly introducing pure hydrogen gas flow through a gas inlet in the reaction furnace. A Gold Image Furnace (P810C) made by ULVAC-Riko was employed as the reaction furnace. The temperature was raised to the heat treatment temperature shown in Table 1 at a temperature increase rate of 150° C./min and a heat treatment of the duration indicated in Table 1 was conducted at that temperature. Subsequently, the interior of the furnace was cooled to 40° C. at a temperature reduction rate of 20° C./min, after which air was introduced. Subsequently, once the temperature had risen several degrees, the interior of the furnace was cooled to room temperature.

H. Coercive Force-Reducing Treatment by Methane Gas Reduction

The magnetic particles to be treated were heat treated in methane gas-containing reducing atmosphere gas flow (4 vol % $CH_4$+96 vol % $N_2$) in a reaction furnace. In the reduction treatment, reacted gas was discharged through an exhaust outlet while constantly introducing the reducing atmosphere gas flow through a gas inlet in the reaction furnace. Before feeding the reducing atmosphere gas into the furnace, it was adjusted by mixing to the concentration recorded in Table 1. A Gold Image Furnace (P810C) made by ULVAC-Riko was employed as the reaction furnace. The temperature was raised to the heat treatment temperature shown in Table 1 at a temperature increase rate of 150° C./min and a heat treatment of the duration indicated in Table 1 was conducted at that temperature. Subsequently, the interior of the furnace was cooled to room temperature at a temperature reduction rate of 20° C./min. After the reduction treatment, the magnetic particles were removed from the furnace in a nitrogen gas flow.

I. Coercive Force-Reducing Treatment by Methane Gas Reduction after Adhering with Transition Metal Salt A cobalt chloride solution with 2 mmol of cobalt chloride per 100 g of solution was prepared with cobalt chloride hexahydrate.

The magnetic particles to be treated were immersed in the cobalt chloride solution (1 g of solution per 1 g of particles) prepared so as to wet the surface of the particles. While reducing the pressure with an aspirator, the solvent was removed. In this process, the particles in the salt solution were stirred once each 30 minutes.

The dry powder obtained by removing the solvent was treated for the duration indicated in Table 1 at the temperature indicated in Table 1 in a 4 vol % $CH_4$ 96 vol % $N_2$ gas flow to reduce and decompose the Co salt contained in the covering layer on the surface of the particles.

Through this process, core/shell magnetic particles were obtained that had a core in the form of the magnetic particle to be treated and a shell in the form of a Co-containing soft magnetic phase.

J. Coercive Force-Reducing Treatment by Thermal Decomposition after Adhering with Transition Metal Complex (1) Iron (III) acetyl acetonate was dissolved with acetone to prepare a 6 weight percent red solution.

(2) The magnetic particles to be treated were immersed in the above solution so as to wet the surface of the particles (using 1 gram of solution (iron (III) acetyl acetonate content: 340 μmol) per gram of particles). While reducing the pressure with an aspirator, the solvent was then removed. In this process, the particles in the solution were stirred once every 30 minutes.

(3) In a heating furnace (Gold Image Furnace QH-P810P made by ULVAC-Riko), the dry powder obtained by removing the solvent in (2) above was heat treated for the duration and at the temperature indicated in Table 1 in a nitrogen gas flow to thermally decompose the iron (III) acetyl acetonate that had precipitated on (adhered to) the surface of the particles.

Since a quantity of the glass component that would completely cover the particle surface was not employed in any of the above preparation examples, the glass component (silica) formed partial coatings in sea/island form on the surface of the magnetic particles before the coercive force-reducing treatment.

Evaluation Methods (1) Coercive Force

The coercive force of the magnetic particles before and after the coercive force-reducing treatment in each of G. to J. above was measured with a superconducting vibrating magnetometer VSM (external magnetic field 3 T) made by Tamagawa Seisakusho.

(2) Particle Size Measurement

The particle size of the magnetic particles before and after the coercive force-reducing treatment in each of F. to I. above was measured by the method set forth above with a transmission electron microscope.

The results of the above are given in Table 1.

TABLE 1

| | | | | | Heat treatment | | Coercive force | | Particle size (nm) | |
| | | | | | | | Before coercive force-reducing treatment | After coercive force-reducing treatment | Before coercive force-reducing treatment | After coercive force-reducing treatment |
| | Particles to be treated | Preparation method of particles to be treated | Coercive force-reducing treatment | | | | | | | |
| | | | Treatment method | Treatment temperature | Duration for treatment | | | | | |
| Example | Barium ferrite on which silica adhered | A | G. Hydrogen reduction | | 200° C. | 15 min | 279 kA/m (3500 Oe) | 203 kA/m (2550 Oe) | 18 | 18 |
| Example | Barium ferrite on which silica adhered | A | H. Methane gas reduction | | 350° C. | 15 min | 279 kA/m (3500 Oe) | 211 kA/m (2650 Oe) | 18 | 18 |

TABLE 1-continued

| | Particles to be treated | Preparation method of particles to be treated | Coercive force-reducing treatment | | | Coercive force | | Particle size (nm) | |
| | | | Treatment method | Heat treatment | | Before coercive force-reducing treatment | After coercive force-reducing treatment | Before coercive force-reducing treatment | After coercive force-reducing treatment |
| | | | | Treatment temperature | Duration for treatment | | | | |
|---|---|---|---|---|---|---|---|---|---|
| Example | Barium ferrite on which silica adhered | A | I. Methane gas reduction after adhering with transition metal salt | 350° C. | 15 min | 279 kA/m (3500 Oe) | 179 kA/m (2250 Oe) | 18 | 19 |
| Example | Barium ferrite on which silica adhered | A | J. Thermal decomposition after adhering with transition metal complex | 350° C. | 1 h | 279 kA/m (3500 Oe) | 187 kA/m (2350 Oe) | 18 | 19 |
| Comp. Ex. | Barium ferrite from which silica was removed | D | G. Hydrogen reduction | 200° C. | 15 min | 275 kA/m (3450 Oe) | 191 kA/m (2400 Oe) | 18 | 25 |
| Comp. Ex. | Barium ferrite from which silica was removed | D | H. Methane gas reduction | 350° C. | 15 min | 275 kA/m (3450 Oe) | 203 kA/m (2550 Oe) | 18 | 30 |
| Comp. Ex. | Barium ferrite from which silica was removed | D | I. Methane gas reduction after adhering with transition metal salt | 350° C. | 15 min | 275 kA/m (3450 Oe) | 171 kA/m (2150 Oe) | 18 | 32 |
| Comp. Ex. | Barium ferrite from which silica was removed | D | J. Thermal decomposition after adhering with transition metal complex | 350° C. | 1 h | 275 kA/m (3450 Oe) | 179 kA/m (2250 Oe) | 18 | 34 |
| Example | Unsubstituted ε-iron oxide on which silica adhered | B | G. Hydrogen reduction | 250° C. | 15 min | 637 kA/m (8000 Oe) | 438 kA/m (5500 Oe) | 12 | 12 |
| Example | Unsubstituted ε-iron oxide on which silica adhered | B | G. Hydrogen reduction | 275° C. | 15 min | 637 kA/m (8000 Oe) | 366 kA/m (4600 Oe) | 12 | 13 |
| Comp. Ex. | Unsubstituted ε-iron oxide from which silica was removed | E | G. Hydrogen reduction | 250° C. | 15 min | 641 kA/m (8050 Oe) | 398 kA/m (5000 Oe) | 12 | 20 |
| Comp. Ex. | Unsubstituted ε-iron oxide from which silica was removed | E | G. Hydrogen reduction | 275° C. | 15 min | 641 kA/m (8050 Oe) | 287 kA/m (3600 Oe) | 12 | 22 |
| Example | Al-substituted ε-iron oxide on which silica adhered | C | G. Hydrogen reduction | 250° C. | 15 min | 597 kA/m (7500 Oe) | 430 kA/m (5400 Oe) | 12 | 12 |
| Example | Al-substituted ε-iron oxide on which silica adhered | C | G. Hydrogen reduction | 275° C. | 15 min | 597 kA/m (7500 Oe) | 374 kA/m (4700 Oe) | 12 | 12 |
| Comp. Ex. | Al-substituted ε-iron oxide from which silica was removed | F | G. Hydrogen reduction | 250° C. | 15 min | 589 kA/m (7400 Oe) | 390 kA/m (4900 Oe) | 12 | 21 |

TABLE 1-continued

| | Particles to be treated | Preparation method of particles to be treated | Coercive force-reducing treatment | | | Coercive force | | Particle size (nm) | |
| | | | Treatment method | Heat treatment | | Before coercive force-reducing treatment | After coercive force-reducing treatment | Before coercive force-reducing treatment | After coercive force-reducing treatment |
| | | | | Treatment temperature | Duration for treatment | | | | |
|---|---|---|---|---|---|---|---|---|---|
| Comp. Ex. | Al-substituted ε-iron oxide from which silica was removed | F | G. Hydrogen reduction | 275° C. | 15 min | 589 kA/m (7400 Oe) | 291 kA/m (3650 Oe) | 12 | 23 |

As shown in Table 1, the magnetic particles obtained by conducting a coercive force-reducing treatment accompanied by heating after adhering with a glass component were fine magnetic particles having lower coercive force than magnetic particles before the treatment, and had coercive force that was suited to recording.

Based on the above results, an aspect of the present invention can be determined to yield fine magnetic particles having coercive force that is suited to recording.

An aspect of the present invention is useful in the field of manufacturing high density recording-use magnetic recording media.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing magnetic particles, wherein the magnetic particles are magnetic particles for magnetic recording, and
the method comprises:
subjecting starting material magnetic particles to a glass component-adhering treatment; and
subjecting the magnetic particles after the glass component-adhering treatment to coercive force-reducing treatment with heating, to provide magnetic particles having lower coercive force than the starting material magnetic particles,
wherein
the starting material magnetic particles are ferrite magnetic particles, and
the coercive force-reducing treatment is conducted by subjecting the magnetic particles after the glass component-adhering treatment to adhering with a transition metal-containing organic compound on the surface of the magnetic particles then thermally decomposing the compound.

2. The method of manufacturing magnetic particles according to claim 1, wherein in the glass component-adhering treatment, a surface of the starting material magnetic particles is partially coated with the glass component.

3. The method of manufacturing magnetic particles according to claim 1, wherein the glass component is a hydrolysis product of a silicon compound.

4. The method of manufacturing magnetic particles according to claim 3, wherein the silicon compound is alkoxysilane.

5. The method of manufacturing magnetic particles according to claim 1, which comprises admixing a precursor of the glass component to a solution comprising the starting material magnetic particles to subject the starting material magnetic particles to adhering with the glass component in the form of a hydrolysis product of the precursor.

6. The method of manufacturing magnetic particles according to claim 1, which further comprises a step of removing the glass component from the surface of the magnetic particles after the coercive force-reducing treatment.

7. The method of manufacturing magnetic particles according to claim 6, wherein the glass component is dissolved and removed with alkali.

8. The method of manufacturing magnetic particles according to claim 1, wherein the coercive force-reducing treatment is conducted by heat treating the magnetic particles in a reducing atmosphere after the glass component-adhering treatment.

9. The method of manufacturing magnetic particles according to claim 8, wherein the reducing atmosphere comprises reducing gas selected from the group consisting of hydrogen gas and hydrocarbon gas.

10. The method of manufacturing magnetic particles according to claim 8, which further comprises, before the heat treatment, subjecting the magnetic particles after the glass component-adhering treatment to adhering with a transition metal salt on the surface of the magnetic particles.

11. The method of manufacturing magnetic particles according to claim 10, wherein the thermal decomposition is conducted by gas phase thermal decomposition.

12. The method of manufacturing magnetic particles according to claim 10, wherein the transition metal-containing organic compound is a transition metal complex comprising a ligand in the form of an acetyl acetonate compound.

13. The method of manufacturing magnetic particles according to claim 1, wherein the starting material magnetic particles are hexagonal ferrite magnetic particles.

14. The method of manufacturing magnetic particles according to claim 1, wherein the starting material magnetic particles are ε-iron oxide particles.

15. The method of manufacturing magnetic particles according to claim 1, wherein the starting material magnetic particles have coercive force of equal to or greater than 230 kA/m.

16. The method of manufacturing magnetic particles according to claim 1, wherein the magnetic particles provided through the coercive force-reducing treatment with heating have a particle size ranging from 8 nm to 30 nm.

* * * * *